No. 858,771. PATENTED JULY 2, 1907.
S. A. WHITEHOUSE.
VALVE.
APPLICATION FILED AUG. 23, 1906.
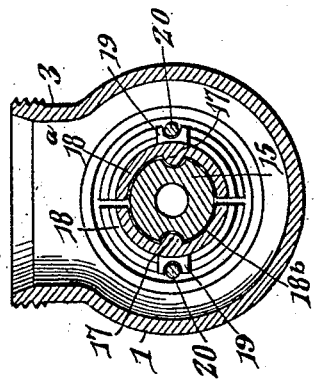
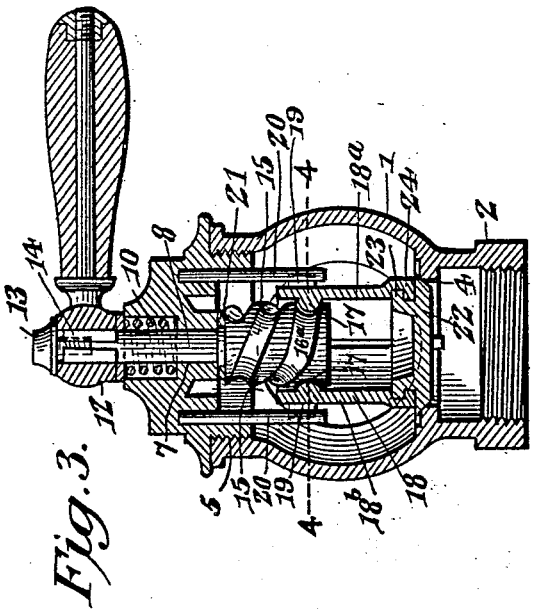
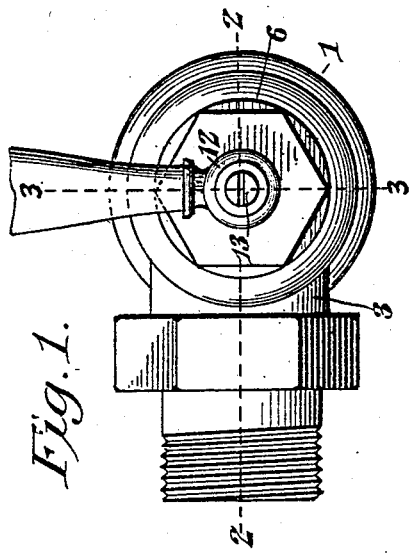
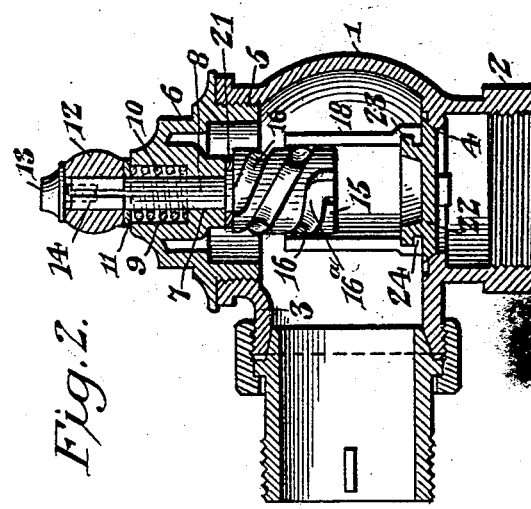
S. A. Whitehouse, Inventor

UNITED STATES PATENT OFFICE.

SAMUEL ALMA WHITEHOUSE, OF KEWANEE, ILLINOIS, ASSIGNOR TO WESTERN TUBE COMPANY, OF KEWANEE, ILLINOIS, A CORPORATION OF ILLINOIS.

VALVE.

No. 858,771.    Specification of Letters Patent.    Patented July 2, 1907.

Application filed August 23, 1906. Serial No. 331,775.

*To all whom it may concern:*

Be it known that I, SAMUEL ALMA WHITEHOUSE, a citizen of the United States, residing at Kewanee, in the county of Henry and State of Illinois, have invented a new and useful Valve, of which the following is a specification.

This invention relates to improvements in valves, and more particularly to an angle valve of that type which is characterized by an angular body or casing, the passage through which is controlled by a valve whose stem rises through the bonnet of the casing and is operated by a suitable handle to open and close the valve.

The object of the invention is to produce a quick acting valve having a self-packing non-rising stem, and capable of being manufactured at small cost and assembled with facility and despatch.

Another object is to so connect the valve and its stem that while the latter is capable of imparting a quick opening or closing movement to the valve, it will exert great power upon the valve to close the same tightly against high pressure and to hold it firmly to its seat, and will also exert sufficient power upon the valve during the first part of the opening movement to overcome any tendency of the valve to stick.

A further object is to connect the valve proper with the stem by means of a sleeve formed in sections to facilitate assembling and so connected to the valve and valve stem that the latter will be permitted practically universal movement to render it self-seating.

To the accomplishment of these objects, the invention resides in those features of construction and arrangement to be hereinafter described, illustrated in the accompanying drawings, and succinctly defined in the appended claims.

In said drawings—Figure 1 is a plan view of the valve. Fig. 2 is a section on the line 2—2 of Fig. 1. Fig. 3 is a section on the line 3—3 of Fig. 1, and Fig. 4 is a section on the line 4—4 of Fig. 3.

Each part is indicated by the same reference character in all of the views.

1 indicates a body or casing provided with angularly related pipe connections 2 and 3, a valve seat 4, and an internally threaded opening 5 located opposite the valve. The opening 5 is closed by an externally threaded bonnet 6 screwed into the opening and having an axial bore 7 through which is extended the reduced upper portion of the valve stem 8. The upper portion of the bore 7 is enlarged, as indicated at 9, to accommodate a coiled spring 10 which encircles the stem 8 and bears at one end against the bottom wall of the enlargement 9 and at its opposite end against a washer 11 interposed between the top of the bonnet and a suitable valve-operating handle or lever 12. The handle 12 is secured to the valve stem in any suitable manner, as for instance by means of a screw 13 screwed into the upper end of the stem 8, which latter is provided with a squared extremity 14 fitting within a corresponding opening in the handle.

Below the reduced portion of the valve stem 8 the latter is provided with an enlargement 15 formed in its periphery with spiral grooves or channels 16 engaged by substantially semi-spherical projections 17 extending inwardly from the opposite semi-cylindrical sections 18ª and 18ᵇ of the valve sleeve 18. The sleeve 18 is formed, as stated, in two semi-cylindrical disconnected sections and is designed to move vertically upon the enlargement 15 of the valve stem when the latter is rotated in a manner to cause the co-operation of the grooves 16 and the lugs 17 formed respectively in the valve stem and upon the sleeve.

To guide the sleeve 18 in its movement and to prevent its rotation with the valve stem, the sleeve and bonnet are provided with coöperating guides 19 and 20, the guides 19 being in the form of lugs extending radially from the respective sections of the sleeve 18 and recessed to receive the guides 20 in the form of guide rods depending from the bonnet 6 at diametrically opposite points, see Figs. 3 and 4. To insure a fluid-tight joint between the valve stem and the bonnet, a gasket 21 of soft copper or vulcanized rubber is interposed between the upper surface of the enlargement 15 of the valve stem and the adjacent surface of the bonnet.

The valve proper, indicated by 22, is swiveled at the lower end of the sleeve 18 in any suitable manner and seats upon the valve seat 4 when the sleeve 18 is depressed to its lowest position by the rotation of the valve stem. In the illustrated embodiment of the invention the swiveled connection between the valve and sleeve is effected by providing said elements with overlapping annular flanges 23 and 24 which provide for the free rotation of the valve independently of the sleeve, but compel the valve to move with the sleeve when the latter is raised to open the valve, or lowered to close the same.

Attention is now directed to the fact that the mounting of the valve 23 permits of substantially universal movement of the valve so that the latter will be self-seating. The lugs 19 on the sleeve sections do not fit the guide rods 20 closely, so that said guides, while coöperating to prevent rotary movement of the sleeve, do not prevent the latter from having such play as is necessary for the proper seating of the valve. Furthermore, since the sleeves are disconnected and slightly separated, and are connected to the valve stem by substantially semi-spherical lugs, the connection between the sleeve sections and the stem are practically ball joints, enabling the valve to have limited movement in any lateral direction which may be necessary to cause it to accurately seat itself when lowered upon the seat 4.

The pitch of the spiral grooves 16 is such that a half-turn of the handle 12 will completely open or close the valve which is therefore quickly operated, while the arrangement of the stem and bonnet is such that the stem is self-packing, the spring 10 serving to clamp the gasket 21 between the bonnet and the stem enlargement when the fluid pressure is insufficient for that purpose. It will be noted, furthermore, that the entire structure may be manufactured at small cost and the parts readily assembled, the sleeve sections 18a and 18b requiring no threads or finishing, the bonnet 3 having no internal threads and being constructed without a dry sand core, and the valve stem, including the grooved enlargement, being a plain casting and requiring little or no finishing.

In conclusion, attention is directed to what is thought to be one of the most important features of the invention. It will be understood that in order to accomplish the quick opening and closing of the valve by means of comparatively slight movement of the stem, the spiral groove 6 must be of high pitch, which necessarily means a gain in speed but a loss in power. Therefore, the use of grooves of uniformly high pitch throughout their extent would result in a quick acting valve, but one having correspondingly reduced power to close against high pressures or to open in the event of the valve being stuck in its seat, as is common after the valve has remained closed for an extended period.

In order to obtain the quick action of the valve without a corresponding loss of power at that particular point in the valve movement at which power is essential, I impart to the major portions of the grooves 16 the high pitch essential to quick movement, but the lower end portions of the grooves, towit, the portions marked 16a, Figs. 2 and 3, are given a low or slow pitch, these portions of the grooves having a gradual rise, as distinguished from the quick rise of the upper major portions of said grooves. As a result of this construction, the valve stem will exert great power upon the valve during the final portion of its closing movement and during the initial portion of its opening movement, but during the major portion of both the opening and closing movements of the valve the action will be exceedingly quick. It will be obvious that by this arrangement I am able to secure all of the advantages of a valve having a quick action without sacrificing any of the advantages possessed by a valve having a slow action, but great power.

It is thought that from the foregoing, the construction, operation, and many advantages of my valve will be fully comprehended. It is obvious, however, that the details of construction may be varied without departing from the spirit of the invention and I therefore wish to be understood as reserving the right to effect such changes, modifications, and variations thereof as may come fairly within the scope of the protection prayed.

What I claim is:—

1. The combination with a casing, of a rotary valve stem retained against endwise movement, a sleeve arranged to be reciprocated by the rotation of the valve stem and comprising disconnected sections capable of slight relative movement, and a valve carried by the sleeve.

2. The combination with a valve casing, of a rotary valve stem retained against endwise movement and provided with spiral grooves, a sleeve comprising sections each having a single projection located at diametrically opposite points and engaging the grooves in the stem to effect a flexible connection between the stem and sleeve and to cause the reciprocation of the sleeve when the stem is rotated, guiding means for the sleeve, and a valve carried by said sleeve.

3. The combination with a valve casing, of a rotary valve stem retained against endwise movement and provided with spiral grooves, a pair of sleeve sections each provided with a semi-spherical projection engaging a groove in the valve stem, guiding means for the sleeve sections, and a valve carried by the sleeve sections conjointly.

4. The combination with a valve casing, of a rotary stem retained against endwise movement and provided with spiral grooves, a sleeve encircling the stem and comprising separate disconnected sections each having a projection engaging one of the spiral grooves, guiding means for the sleeve sections and a valve swiveled at one end of the sleeve.

5. The combination with a valve casing having a valve seat and bonnet, of a valve stem rotatable in the bonnet and provided with an enlargement having external spiral grooves, a handle secured to the outer end of the valve stem, a spring encircling the valve stem and opposed at its opposite ends by the handle and bonnet respectively, a gasket interposed between the bonnet and the enlargement of the valve stem, a pair of sleeve sections having internal projections engaging the spiral grooves and external guide lugs, guide rods extended from the bonnet and engaging the guide lugs, and a valve swiveled at the lower ends of the sleeve sections.

6. The combination with a valve casing, of a rotary valve stem retained against endwise movement, a pair of separate sleeve sections, a separate operative connection between each sleeve section and the rotary valve stem, each of said connections comprising coöperating elements, one of which is in the form of a spiral of non-uniform pitch, and a valve carried by the sleeve sections conjointly.

7. The combination with a valve casing, of a rotary valve stem retained against endwise movement and provided with spiral grooves having end portions of relatively low pitch, a pair of sleeve sections each provided with a projection engaging one of the grooves in the valve stem, guiding means for the sleeve sections, and a valve carried by the sleeve sections conjointly.

8. The combination with a valve casing having a valve seat and body, of a rotary valve stem retained against endwise movement, an endwise movable sleeve in coöperative relation with the valve stem and comprising separate sleeve sections, a valve carried by the sleeve sections conjointly, and means for causing the sleeve to move endwise when the valve stem is rotated, said means including a projection on each sleeve section and spiral elements each engaged by one of said projections.

9. The combination with a valve casing, of a rotary valve stem, a valve, a valve carrying sleeve carried by the stem and having limited lateral movement relative thereto to insure the proper seating of the valve, and a double connection between the sleeve and stem, said connection including spiral grooves formed in one of said elements and lugs extended into said grooves from the other element, one end portion of each groove having a pitch different from that of the remaining portion of said groove.

10. The combination with a valve casing, of a rotary valve stem, a sleeve carried by and surrounding the stem and having limited lateral movement relative to the stem, a valve carried at one end of the sleeve, and a connection between the sleeve and stem, said connection including spiral grooves formed in one of said elements and lugs extended into the grooves from the other element and permitting the necessary lateral movement of the sleeve to seat the valve, and one end portion of each of said grooves having a pitch different from that of the remaining portion of the groove.

In testimony, that I claim the foregoing as my own, I have hereto affixed my signature in the presence of two witnesses.

SAMUEL ALMA WHITEHOUSE.

Witnesses:
WM. BENNETT,
ROSS MCKIERNAN.